(12) United States Patent
Carl et al.

(10) Patent No.: US 8,542,219 B2
(45) Date of Patent: Sep. 24, 2013

(54) PROCESSING POSE DATA DERIVED FROM THE POSE OF AN ELONGATE OBJECT

(75) Inventors: Stewart R. Carl, Palo Alto, CA (US); Michael J. Mandella, Palo Alto, CA (US); Guanghua G. Zhang, San Jose, CA (US); Hector H. Gonzalez-Banos, Mountain View, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 1212 days.

(21) Appl. No.: 10/769,484

(22) Filed: Jan. 30, 2004

(65) Prior Publication Data
US 2005/0168437 A1 Aug. 4, 2005

(51) Int. Cl.
*G06F 3/033* (2013.01)

(52) U.S. Cl.
USPC .......................... 345/179; 345/156; 345/166

(58) Field of Classification Search
USPC .................. 345/156–184; 157/18.01, 18.09, 157/19.05
See application file for complete search history.

(56) References Cited

U.S. PATENT DOCUMENTS

| | | |
|---|---|---|
| 4,070,649 A | 1/1978 | Wright, Jr. et al. |
| 4,471,162 A | 9/1984 | Aono et al. |
| 5,103,486 A | 4/1992 | Grippi |
| 5,166,668 A | 11/1992 | Aoyagi |
| 5,215,397 A | 6/1993 | Taguchi et al. |
| 5,226,091 A | 7/1993 | Howell |
| 5,294,792 A | 3/1994 | Lewis et al. |
| 5,333,209 A | 7/1994 | Sinden et al. |
| 5,434,371 A | 7/1995 | Brooks |
| 5,477,012 A | 12/1995 | Sekendur |
| 5,484,966 A | 1/1996 | Segen |

(Continued)

FOREIGN PATENT DOCUMENTS

| | | |
|---|---|---|
| EP | 0649549 B1 | 2/1997 |
| WO | WO 02/17222 A2 | 2/2002 |

(Continued)

OTHER PUBLICATIONS

U.S. Appl. No. 10/640,942, Carl. U.S. Appl. No. 10/745,371, Buermann et al.
Larsson and Pettersson, Development and evaluation of a 6DOF interface to be used in a medical application, Linkopings Univ., Sweden, Jun. 5, 2002.
Poyner, LCS/Telegraphics, "Wintab Interface Specification: 16 bit and 32-bit API Reference", Revised May 9, 1996.

(Continued)

*Primary Examiner* — Seokyun Moon
(74) *Attorney, Agent, or Firm* — Marek Alboszta

(57) ABSTRACT

An apparatus and method for processing pose data derived from a pose of an elongate object such as, for example, a jotting implement, a pointer, a robotic arm or a cane. The elongate object has a tip contacting a plane surface with one or more invariant features. The pose of the elongate object is measured optically from on-board by an optical measuring system with the aid of the invariant feature. The pose is used for preparing a corresponding pose data and a subset of the pose data is identified and transmitted to an application such as a user application, where the subset can serve as command data or input data. Since the elongate object moves while its tip is contacting the surface the pose is measured periodically at sufficiently frequent measurement times $t_i$ to describe the motion at a desired temporal resolution. The subset can include all or a portion of the orientation data that describe the orientation of the elongate object in space and/or position data of the tip on the surface. The position can be a relative position of the tip with respect to any feature or its previous position, or an absolute position in world coordinates. The subset can also contain a mix of orientation and position data.

30 Claims, 9 Drawing Sheets

(56) References Cited

U.S. PATENT DOCUMENTS

| | | |
|---|---|---|
| 5,517,579 A | 5/1996 | Baron |
| 5,533,141 A | 7/1996 | Futatsugi et al. |
| 5,544,255 A | 8/1996 | Smithies et al. |
| 5,548,092 A | 8/1996 | Shriver |
| 5,577,135 A | 11/1996 | Grajski et al. |
| 5,581,276 A | 12/1996 | Cipolla et al. |
| 5,587,558 A | 12/1996 | Matsushima |
| 5,640,589 A | 6/1997 | Takayama et al. |
| 5,647,017 A | 7/1997 | Smithies et al. |
| 5,652,412 A | 7/1997 | Lazzouni et al. |
| 5,661,506 A | 8/1997 | Lazzouni et al. |
| 5,694,153 A * | 12/1997 | Aoyagi et al. ............. 345/161 |
| 5,717,168 A | 2/1998 | LeBuisser et al. |
| 5,737,740 A | 4/1998 | Henderson et al. |
| 5,748,808 A | 5/1998 | Taguchi et al. |
| 5,750,939 A | 5/1998 | Makinwa et al. |
| 5,768,417 A | 6/1998 | Errico et al. |
| 5,774,602 A | 6/1998 | Taguchi et al. |
| 5,781,661 A | 7/1998 | Hiraiwa et al. |
| 5,818,955 A | 10/1998 | Smithies et al. |
| 5,850,058 A | 12/1998 | Tano et al. |
| 5,852,434 A | 12/1998 | Sekendur |
| 5,870,492 A | 2/1999 | Shimizu et al. |
| 5,902,968 A | 5/1999 | Sato et al. |
| 5,930,380 A | 7/1999 | Kashi et al. |
| 5,939,702 A | 8/1999 | Knighton et al. |
| 5,959,617 A | 9/1999 | Bird et al. |
| 5,960,124 A | 9/1999 | Taguchi et al. |
| 5,977,958 A | 11/1999 | Baron et al. |
| 5,981,884 A | 11/1999 | Sato et al. |
| 6,031,936 A | 2/2000 | Nakamura |
| 6,044,165 A | 3/2000 | Perona et al. |
| 6,050,490 A | 4/2000 | Leichner et al. |
| 6,064,751 A | 5/2000 | Smithies et al. |
| 6,081,261 A | 6/2000 | Wolff et al. |
| 6,084,985 A | 7/2000 | Dolfing et al. |
| 6,091,835 A | 7/2000 | Smithies et al. |
| 6,100,877 A | 8/2000 | Chery et al. |
| 6,104,387 A | 8/2000 | Chery et al. |
| 6,104,388 A | 8/2000 | Nagai et al. |
| 6,108,444 A | 8/2000 | Sydea-Mahmood |
| 6,111,565 A | 8/2000 | Chery et al. |
| 6,124,847 A | 9/2000 | Chery et al. |
| 6,130,666 A | 10/2000 | Persidsky |
| 6,147,681 A | 11/2000 | Chery et al. |
| 6,153,836 A | 11/2000 | Goszyk |
| 6,167,376 A | 12/2000 | Ditzik |
| 6,177,927 B1 | 1/2001 | Chery et al. |
| 6,181,329 B1 | 1/2001 | Stork et al. |
| 6,184,873 B1 | 2/2001 | Ward et al. |
| 6,188,392 B1 | 2/2001 | O'Connor et al. |
| 6,208,330 B1 | 3/2001 | Hasegawa et al. |
| 6,212,296 B1 | 4/2001 | Stork et al. |
| 6,213,398 B1 | 4/2001 | Southworth et al. |
| 6,243,503 B1 | 6/2001 | Teufel et al. |
| 6,249,274 B1 | 6/2001 | Svancarek et al. |
| 6,262,719 B1 | 7/2001 | Bi et al. |
| 6,292,177 B1 | 9/2001 | Holtzman et al. |
| 6,330,359 B1 | 12/2001 | Kawabata |
| 6,334,003 B1 | 12/2001 | Yokota |
| 6,335,723 B1 | 1/2002 | Wood et al. |
| 6,335,724 B1 | 1/2002 | Takekawa et al. |
| 6,335,727 B1 | 1/2002 | Morishita et al. |
| 6,348,914 B1 | 2/2002 | Tuli |
| 6,366,697 B1 | 4/2002 | Goldberg et al. |
| 6,396,481 B1 | 5/2002 | Challa et al. |
| 6,414,673 B1 | 7/2002 | Wood et al. |
| 6,415,256 B1 | 7/2002 | Ditzik |
| 6,421,042 B1 | 7/2002 | Omura et al. |
| 6,422,775 B1 | 7/2002 | Bramlett et al. |
| 6,424,340 B1 | 7/2002 | Holtzman et al. |
| 6,429,856 B1 | 8/2002 | Omura et al. |
| 6,437,314 B1 | 8/2002 | Usuda et al. |
| 6,454,482 B1 | 9/2002 | Silverbrook et al. |
| 6,456,749 B1 | 9/2002 | Kasabach et al. |
| 6,474,888 B1 | 11/2002 | Lapstun et al. |
| 6,492,981 B1 | 12/2002 | Stork et al. |
| 6,493,736 B1 | 12/2002 | Forcier |
| 6,502,114 B1 | 12/2002 | Forcier |
| 6,556,190 B2 | 4/2003 | Fleck et al. |
| 6,565,611 B1 | 5/2003 | Wilcox et al. |
| 6,573,887 B1 | 6/2003 | O'Donnell, Jr. |
| 6,577,299 B1 | 6/2003 | Schiller et al. |
| 6,592,039 B1 | 7/2003 | Smith et al. |
| 6,625,296 B2 | 9/2003 | Price et al. |
| 6,627,870 B1 | 9/2003 | Lapstun et al. |
| 6,628,847 B1 | 9/2003 | Kasabach et al. |
| 6,650,320 B1 | 11/2003 | Zimmerman |
| 6,661,920 B1 | 12/2003 | Skinner |
| 6,686,579 B2 | 2/2004 | Fagin et al. |
| 6,686,910 B2 | 2/2004 | O'Donnell, Jr. |
| 6,687,876 B1 | 2/2004 | Schilt et al. |
| 6,689,966 B2 | 2/2004 | Wiebe |
| 2001/0020936 A1 * | 9/2001 | Tsuji ........................ 345/177 |
| 2002/0001029 A1 | 1/2002 | Abe |
| 2002/0028017 A1 | 3/2002 | Munich et al. |
| 2002/0048404 A1 | 4/2002 | Fahraeus et al. |
| 2002/0118181 A1 | 8/2002 | Sekendur |
| 2002/0145587 A1 | 10/2002 | Watanabe |
| 2002/0148655 A1 | 10/2002 | Cho et al. |
| 2002/0158848 A1 | 10/2002 | Sekendur |
| 2002/0163511 A1 | 11/2002 | Sekendur |
| 2002/0180714 A1 | 12/2002 | Duret |
| 2003/0006973 A1 | 1/2003 | Omura et al. |
| 2003/0006975 A1 | 1/2003 | Moriya et al. |
| 2003/0025713 A1 | 2/2003 | Wang et al. |
| 2003/0025951 A1 | 2/2003 | Pollard et al. |
| 2003/0029919 A1 | 2/2003 | Lynggaard et al. |
| 2003/0034961 A1 | 2/2003 | Kao |
| 2003/0038790 A1 | 2/2003 | Koyama et al. |
| 2003/0106985 A1 | 6/2003 | Fagin et al. |
| 2003/0107558 A1 | 6/2003 | Bryborn et al. |
| 2003/0146906 A1 | 8/2003 | Lin |
| 2003/0156145 A1 | 8/2003 | Hullender et al. |
| 2003/0163525 A1 | 8/2003 | Hendriks et al. |
| 2003/0195820 A1 | 10/2003 | Silverbrook et al. |

FOREIGN PATENT DOCUMENTS

| | | |
|---|---|---|
| WO | WO 02/058029 A2 | 7/2002 |
| WO | WO 02/064380 A1 | 8/2002 |
| WO | WO 02/069247 A1 | 9/2002 |
| WO | WO 02/084634 A1 | 10/2002 |

OTHER PUBLICATIONS

Universal Serial Bus (USB), "Device Class Definition for Human Interface Devices (HID)", Firmware Specification, USB Implementers' Forum, Jun. 27, 2001.

Ait-Aider et al., "Adaptation of Lowe's Camera Pose Recovery Algorithm to Mobile Robot Self-Localisation", Robotica 2002.

Ansar et al., "Linear Pose Estimation from Points or Lines", ECCV 2002, LNCS 2353, pp. 282-296, Springer-Verlag Berlin Heidelberg 2002.

Batista et al., "Pose View Stability Analysis for Camera Look Angles Computation", Institute of Systems and Robotics—Dep. of Elec. Engineering, Univ. of Coimbra, Portugal.

Corradini et al., "A Map-based System Using Speech and 3D Gestures for Pervasive Computing", Center for Human-Computer Communciation, Oregon Health & Science Univ.

Joquet et al., "'Pen-like' Natural Graphic Gesture Capture Disposal, Based on a Micro-System", Dept. of Systems for Information and Health, CEA-Leti Grenoble.

Schroering et al., "A New Input Device for 3D Sketching", Washington University in St. Louis.

Ude, "Nonlinear Least Squares Optimisation of Unit Quaternion Functions for Pose Estimation from Corresponding Features", Conf. Pattern Recognition, Brisbane, pp. 425-427 Aug. 98.

* cited by examiner

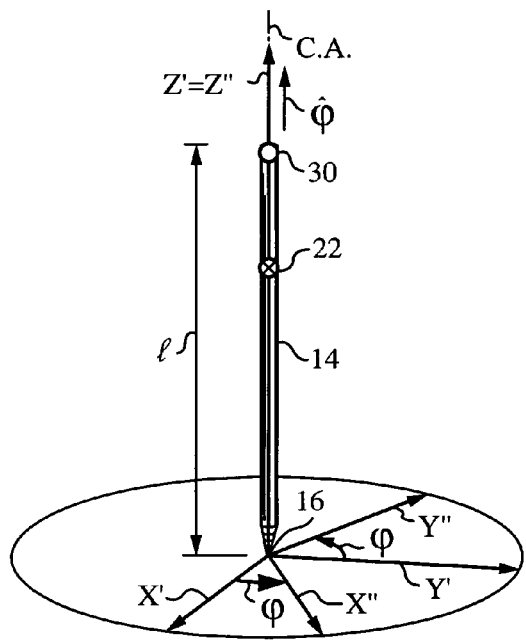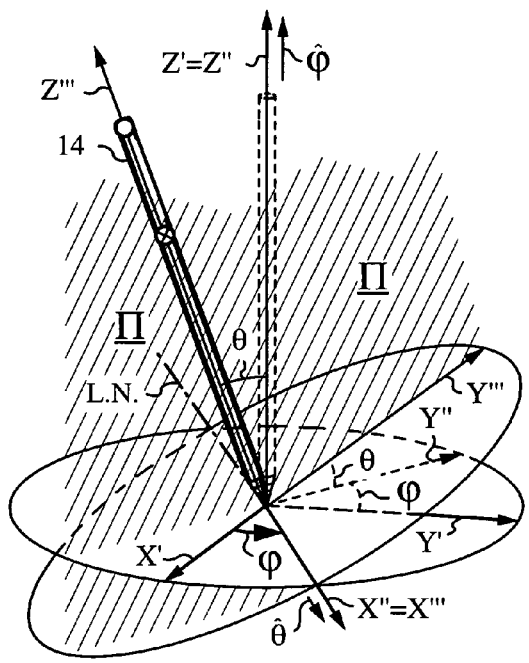
FIG. 2A
FIG. 2B
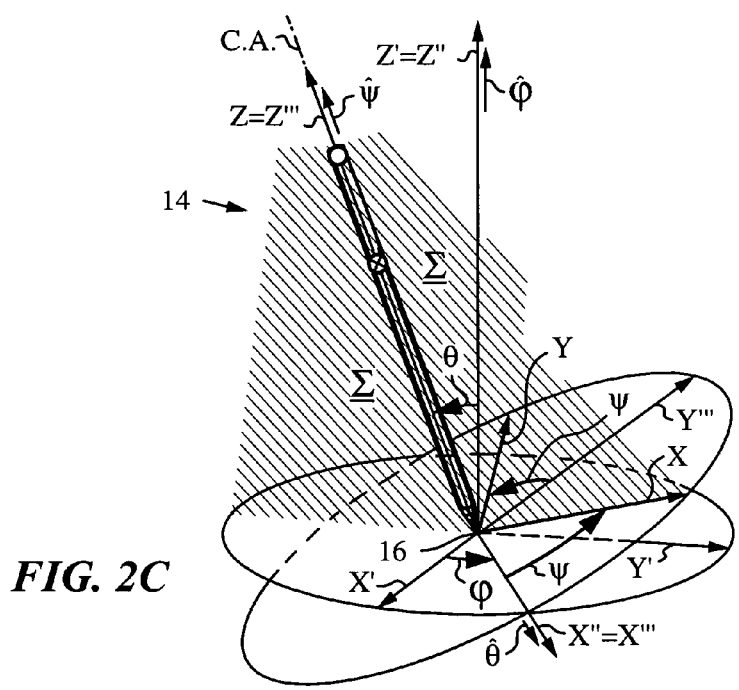
FIG. 2C

PROCESSING POSE DATA DERIVED FROM THE POSE OF AN ELONGATE OBJECT

FIELD OF THE INVENTION

The present invention relates generally to an apparatus and method for processing data derived from a pose of an elongate object having a tip in contact with a plane surface.

BACKGROUND OF THE INVENTION

When an object moves with respect to stationary references such as a ground plane, fixed points, lines or reference surfaces, knowledge of the object's inclination with respect to these references can be used to derive a variety of its parameters of motion as well as its pose. Over time, many useful coordinate systems and methods have been developed to track the pose of objects and to parameterize their equations of motion. For a theoretical background the reader is referred to textbooks on classical mechanics such as Goldstein et al., Classical Mechanics, $3^{rd}$ Edition, Addison Wesley 2002.

In one specific field it is important to know the pose of an object to derive the position of its tip while it contacts a plane surface. Various types of elongate objects can benefit from knowledge of their pose and position of their tip, and more precisely the absolute position (in world coordinates) of their tip while it is in contact with a plane surface. These objects include walking canes when in touch with the ground, pointers when in touch with a display or projection surface, writing devices when in touch with a writing surface, and styluses when in touch with an input screen.

The need to determine the absolute position of the tip or nib is deeply felt in the field of input devices such as pens and styluses. Here, the absolute position of the tip has to be known in order to analyze the information written or traced by the user on the writing surface. Numerous teachings of pens and related input devices providing relative tip position and absolute tip position are discussed in the prior art. Some of these teachings rely on inertial navigation devices including gyroscopes and accelerometers as described in U.S. Pat. Nos. 6,492,981; 6,212,296; 6,181,329; 5,981,884; 5,902,968. Other techniques combine inertial navigation with force sensing as described in U.S. Pat. Nos. 6,081,261; 5,434,371. The prior art also teaches capturing and analyzing forces applied to the pen point in U.S. Pat. No. 5,548,092. Still other techniques rely on triangulation using signal receivers and auxiliary devices on or adjacent to the writing surface as found in U.S. Pat. Nos. 6,177,927; 6,124,847; 6,104,387; 6,100,877; 5,977,958; 5,484,966. It should be noted that various forms of radiation including short radio-frequency (RF) pulses, infrared (1R) pulses, and ultrasound pulses have been taught for triangulation and related techniques. A few examples of yet another set of solutions employing digitizers or tablets are discussed in U.S. Pat. Nos. 6,050,490; 5,750,939; 4,471,162.

The prior art also addresses the use of optical systems to provide relative, and in some cases, absolute position of the tip of a pen or stylus on a surface. For example, U.S. Pat. No. 6,153,836 teaches emitting two light beams from the stylus to two receivers that determine angles with respect to a two-dimensional coordinate system defined within the surface. The tip position of the stylus is found with the aid of these angles and knowledge of the location of the receivers. U.S. Pat. No. 6,044,165 teaches integration of force sensing at the tip of the pen with an optical imaging system having a camera positioned in the world coordinates and looking at the pen and paper. Still other teachings use optical systems observing the tip of the pen and its vicinity. These teachings include, among others, U.S. Pat. Nos. 6,031,936; 5,960,124; 5,850,058. According to another approach, the disclosure in U.S. Pat. No. 5,103,486 proposes using an optical ballpoint in the pen. More recently, optical systems using a light source directing light at paper have been taught, e.g., as described in U.S. Pat. Nos. 6,650,320; 6,592,039 as well as WO 00217222 and U.S. Pat. Appl. Nos. 2003-0106985; 2002-0048404.

In some prior art approaches the writing surface is provided with special markings that the optical system can recognize. Some early examples of pens using special markings on the writing surface include U.S. Pat. Nos. 5,661,506; 5,652,412. More recently, such approach has been taught in U.S. Pat. Appl. 2003-0107558 and related literature. For still further references, the reader is referred to U.S. Pat. Nos. 7,203,384 and 7,088,440 and the references cited therein.

Most of the prior art approaches listed above are limited in that they yield relative position of the tip on the writing surface. Tablets and digitizers obtain absolute position but they are bulky and inconvenient. Of the approaches that provide absolute position of the tip without tablets by using optical systems, most rely on observing the relationship of markings provided on the writing surface to the tip of the pen. This approach is limiting it that it requires a specially-marked writing surface, which acts as a quasi-tablet.

In addition to being cumbersome, state-of-the-art pens and styluses employing optical systems usually generate a limited data set. In fact, most only provide data corresponding to the trace traversed on the writing surface. Meanwhile, there are many applications that could benefit from a rich stream of data from the pen or stylus. In fact, the prior art indicates many situations in which interactions between a user employing a pen or stylus and a machine, e.g., a computer, are limited. For a few examples of applications and systems that could benefit from a richer stream of data from the pen or stylus the reader is referred to U.S. Pat. Nos. 6,565,611; 6,502,114; 6,493,736; 6,474,888; 6,454,482; 6,415,256; 6,396,481 and U.S. Pat. Appl. Nos. 2003-0195820; 2003-0163525; 2003-0107558; 2003-0038790; 2003-0029919; 2003-0025713; 2003-0006975; 2002-0148655; 2002-0145587 and U.S. Pat. No. 6,661,920.

OBJECTS AND ADVANTAGES

In view of the shortcomings of the prior art, it is the object of the invention to provide an apparatus and method for processing pose data derived from a pose of an elongate object such as a jotting implement, cane, pointer or a robotic arm. Specifically, it is an object of the invention to provide for processing of pose data derived in this manner and identification of a subset of the pose data for use as control data or input data in applications.

These and numerous other advantages will become apparent upon reading the detailed description in conjunction with the drawing figures.

SUMMARY OF THE INVENTION

The present invention provides a method for processing pose data derived from a pose of an elongate object whose tip is contacting a plane surface with one or more invariant features. In accordance with the method, the tip is placed on the surface and the physical pose of the elongate object is measured optically from on-board the elongate object with the aid of the invariant feature. The pose data corresponding to the pose is prepared and a subset of the pose data is identified. The subset is transmitted to an application such as a user application, where the subset can serve as command data or input data. The elongate object can undergo a motion while its tip is contacting a surface. Thus, in a preferred embodiment the method calls for periodically measuring the pose data at measurement times $t_i$ such that the pose data at successive measurement times $t_i$ can be used to describe the motion at a desired temporal resolution.

The subset can include all or a portion of orientation data that describe the orientation of the elongate object in space. The orientation data can include an inclination angle θ or any angle or set of angles describing orientation in suitable coordinates, e.g., polar coordinates. Alternatively, the subset can include all or a portion of position data of the tip on the surface. The position can be a relative position of the tip relative to any feature including one or more of the invariant features or an absolute position of the tip on the surface in world coordinates. The subset can also contain a mix of orientation and position data.

In one embodiment, the orientation of the elongate object is described by Euler angles and the subset of the pose data includes at least one Euler angle. In fact, in this embodiment the inclination angle θ can be simply the second Euler angle. In addition, the subset can contain a roll angle ψ (third Euler angle) and a rotation angle φ (first Euler angle). The orientation data contained can be used as any type of input. For example, the orientation data can represent control data that is used for executing commands in the application or input data that is entered into the application or simply stored in an appropriate format. Of course, the position data can also be used as any type of input, including control data and input data. It should be noted, that the subset can also contain all of the pose data, e.g., when the application is a motion-capture application.

The invariant features can be permanent or temporary, and spatial or temporal. The plane surface can be a jotting surface, such as a paper surface, a screen, a tablet, a pad or any other type of surface on which a user can perform a jotting operation. In this embodiment the elongate object is preferably a jotting implement such as a pen, pencil or stylus. In general, the elongate object can also be a pointer, a robotic arm or a cane. In fact, the elongate object is any object that whose pose can be used to derive input data.

The invention further provides an apparatus for processing pose data describing the motion of the elongate object whose tip is contacting the surface. The apparatus has a measuring arrangement for optically measuring the pose from on-board the elongate object. The measurement can be periodic at measurement times $t_i$ and the periodicity of this measurement is chosen depending on the application and resolution, e.g., temporal resolution, of pose and pose data required. The apparatus has a processor for preparing the pose data corresponding to the pose and identifying a subset of the pose data. A communication link is provided for transmitting the subset to an application.

The processor is preferably mounted on the elongate object. In applications where considerable data processing is performed by the processor, the processor can be remote. The communication link is preferably a wireless communication link.

The subset separated from the pose data by the processor can be sent to the application for further processing the subset, e.g., using it as input data, by using the same or a different communication link, depending on the location of the host running the user application for which the subset is used as input data. For example, the host is a computer and the application is a data file. In this case the subset can contain input data into the data file. Alternatively, the host is a digital device and the user application is an executable file for executing a command and the subset contains control data. The application can also be a motion-capture application for capturing the motion of the elongate object, or a trace-capture application for capturing the trace described by the tip of the elongate object on the surface during the motion.

The details of the invention will now be described in detail with reference to the drawing figures.

BRIEF DESCRIPTION OF THE DRAWINGS

FIG. 2A-C are diagrams illustrating the Euler rotation convention as used herein.

DETAILED DESCRIPTION

Figure 1:
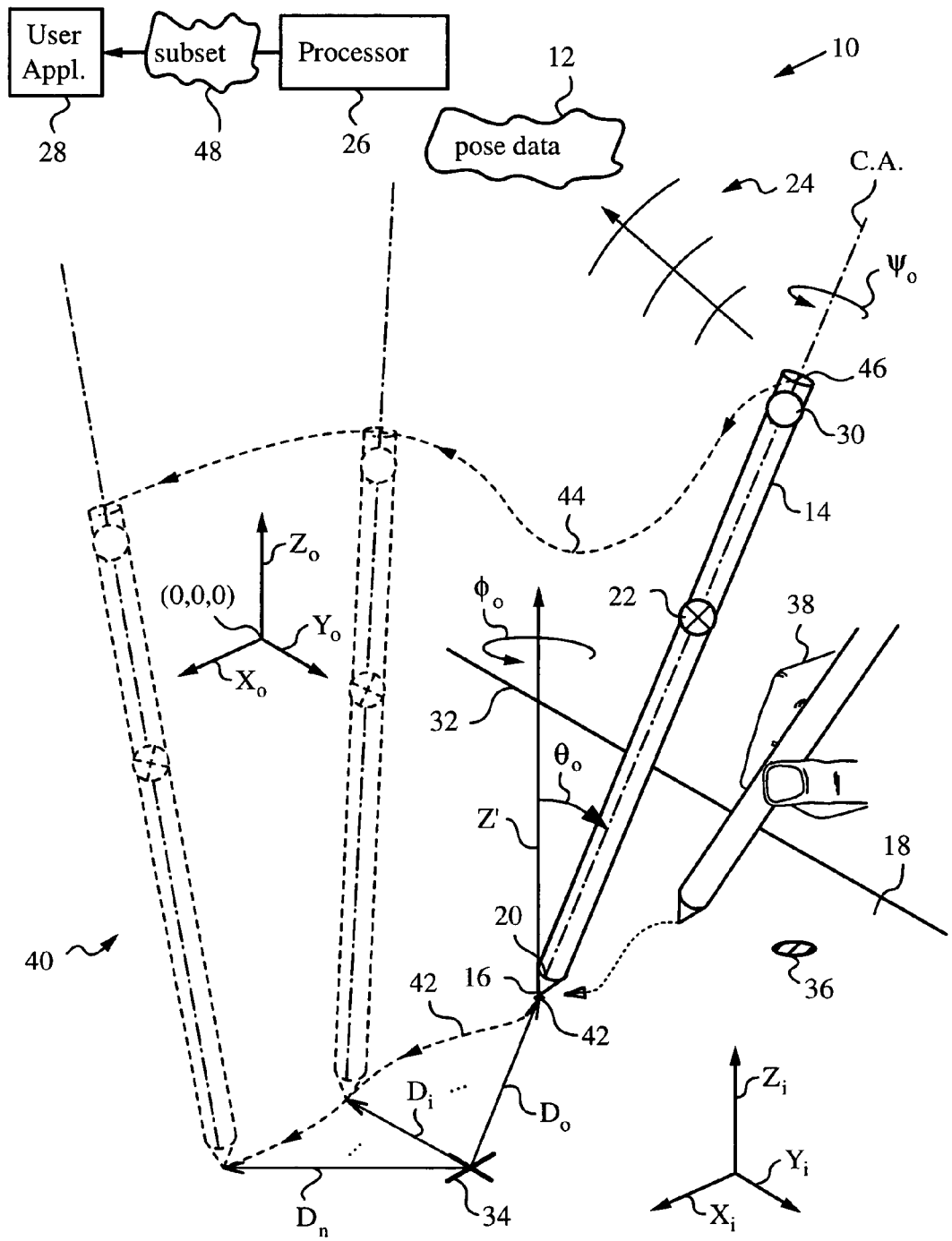
FIG. 1 is a three-dimensional view of an apparatus of the invention illustrating the motion of an elongate object whose tip is contacting a surface.

The present invention will be best understood by first referring to FIG. 1 illustrating an exemplary apparatus 10 for processing pose data 12 derived from a pose of an elongate object 14. Elongate object 14 moves while its tip 16 is in contact with a plane surface 18. Apparatus 10 processes pose data 12 that describe the pose of elongate object 14 at a number of measurement times. Thus, pose data 12 describes the motion that elongate object 14 executes or is made to execute by a user while tip 16 is in contact with surface 18. A sensor 20, e.g., a piezoelectric element or any other suitable sensor can be used to ascertain when tip 16 is contacting surface 18.

Elongate object 14 is any type of generally elongated object whose pose when object 14 is stationary or in motion yields useful pose data 12. For example, elongate object 14 is a cane used for walking support and surface 18 is a walking surface, or elongate object 14 is a robotic arm and surface 18 is a work surface. In still other cases, elongate object 14 is a pointer and surface 18 a screen, or elongate object 14 is a jotting implement, such as a pen, pencil or stylus and surface 18 is a jotting surface. In the present embodiment elongate object 14 is a pointer and surface 18 is a screen or a tracing surface.

Elongate object 14 has an on-board measuring arrangement 22 for optically measuring its pose with the aid of one or more invariant features 32, 34, 36 on surface 18. In the present case all features 32, 34, 36 are on surface 18. In general, however, it is also possible to use features that are not in the plane of surface 18 if there is a sufficient number of features on surface 18.

In the present embodiment, invariant features are an edge 32, a reference point 34 and a surface structure 36. These invariant features are merely exemplary of the types of features that can be temporarily or permanently associated with surface 18 and be used for measuring the pose of object 14. Invariant features 32, 34, 36 are used in deriving a relative or absolute position of tip 16 on surface 18 and for measuring the remaining portion of the pose, i.e., the orientation of pointer 14. Preferably, the positions of invariant features 32, 34 and 36 are defined in world coordinates $(X_o, Y_o, Z_o)$. Furthermore, if possible, the location of invariant features 32, 34 and 36 is preferably such that at least a subset of them is visible to arrangement 22 for all poses that object 14 is expected to assume.

A number of optical measurement methods using on-board arrangement 22 to recover pose of object 14 can be employed. In any of these methods arrangement 22 uses on-board elements to obtain pose data 12 in accordance with any well-known pose recovery technique including geometric invariance, triangulation, ranging, path integration and motion analysis.

In the preferred embodiment arrangement 22 is an optical measurement arrangement such as an imaging system or a scanning system mounted on pointer 14 for on-board determination of the pose with reference to one or more of invariant features 32, 34, 36 on surface 18.

Apparatus 10 has a processor 26 for preparing pose data 12 corresponding to the pose of pointer 14 and for identifying a subset 48 of pose data 12 required by an application 28. Specifically, application 28 uses subset 48 which may contain all or less than all of pose data 12. Note that processor 26 can be located on pointer 14 or be remote, as is the case in this embodiment.

A communication link 24 is provided for sending pose data 12 to application 28. Preferably, communication link 24 is a wireless communication link established with the aid of a wireless transmitter 30 mounted on pointer 14. In embodiments where processor 26 and application 28 are mounted on pointer 14, communication link 24 can be an electrical connection. In still other embodiments, communication link 24 can be a wired remote link.

During operation a user 38 holds pointer 14 in hand. User 38 places tip 16 of pointer 14 on surface 18 with invariant features 32, 34, 36 and executes a movement such that pointer 14 executes a motion 40. For better visualization, motion 40 is indicated in dashed lines 42, 44 that mark the positions assumed by tip 16 and end 46 of pointer 14 during motion 40.

For the purposes of this invention, line 42 is referred to as the trace of tip 16. Also, for the purposes of the present invention, motion 40 is defined to end at the time when tip 16 stops contacting surface 18.

Motion 40 may produce no movement of end 46 or tip 16, i.e., no trace 42. In fact, motion 40 is not limited by any parameter other than that tip 16 must remain in contact with surface 18. Thus, changes in orientation of pointer 14 are also considered to be motion 40, just as changes in position (i.e., change in x and y coordinates) of tip 16 on surface 18. In the present case, orientation of pointer 14 is described by inclination angle $\theta$, rotation angle $\phi$ and roll angle $\psi$ referenced with respect to a center axis C.A. of pointer 14. A change in at least one of these angles constitutes motion 40.

In the present case, tip 16 touches down on surface 18 at point 48. At the time of touch down center axis C.A. of pointer 14 is inclined to a surface normal Z' at inclination angle $\theta$ equal to $\theta_o$. Furthermore, rotation and roll angles $\phi, \psi$ are equal to $\phi_o, \psi_o$ respectively. For convenience, in the present embodiment angles $\theta, \phi, \psi$ are Euler angles. Of course, other angles can be used to describe the orientation of pointer 14. In fact, a person skilled in the art will appreciate that any convention for describing the rotations of pointer 16 can be adapted for this description. For example, the four Caylyle-Klein angles or quaternions can be employed.

FIGS. 2A-C illustrate a convention for describing the orientation of pointer 14 using the Euler angles. Pointer 14 has a length l measured from tip 16 at the origin of non-rotated object coordinates (X',Y',Z') as shown in FIG. 2A.

Center axis C.A. is collinear with the Z' axis and it passes through tip 16 and the origin of non-rotated object coordinates (X',Y',Z'). In the passive rotation convention used herein objects coordinates will be attached to pointer 14 while pointer 14 is rotated from initial upright position.

Now, FIG. 2A illustrates a first counterclockwise rotation by first Euler angle $\phi$ of object coordinates (X',Y',Z') about the Z' axis. This rotation of the object coordinates does not affect the Z' axis so once rotated Z'' axis is collinear with non-rotated Z' axis (Z''=Z'). On the other hand, axes X' and Y' are rotated by first Euler angle $\phi$ to yield once rotated axes X'' and Y''.

FIG. 2B illustrates a second counterclockwise rotation by second Euler angle $\theta$ applied to once rotated object coordinates (X'',Y'',Z''). This second rotation is performed about the once rotated X'' axis and therefore it does not affect the X'' axis (X'''=X''). On the other hand, axes Y'' and Z'' are rotated by second Euler angle $\theta$ to yield twice rotated axes Y''' and Z'''. This second rotation is performed in a plane Π containing once rotated axes Y'', Z'' and twice rotated axes Y''', Z'''. Note that axis C.A. of pointer 14 is rotated counterclockwise by second Euler angle $\theta$ in plane Π and remains collinear with twice rotated axis Z'''.

A third counterclockwise rotation by third Euler angle $\psi$ is applied to twice rotated object coordinates (X''', Y''', Z''') as shown in FIG. 1C. Rotation by $\psi$ is performed about twice rotated axis Z''' that is already collinear with object axis Z rotated by all three Euler angles. Meanwhile, twice rotated axes X''', Y''' are rotated by $\psi$ to yield object axes X,Y rotated by all three Euler angles. Object axes X,Y,Z rotated by all three Euler angles $\phi, \theta$ and $\psi$ define Euler rotated object coordinates (X,Y,Z). Note that tip 16 of pointer 14 remains at the origin of all object coordinates during the Euler rotations.

Now, referring back to FIG. 1, the pose of pointer 14 includes its orientation, i.e., Euler angles $(\phi, \theta, \psi)$, and position of tip 16, i.e., the coordinates (x,y,z) of the point at which tip 16 contacts surface 18. For convenience, the orientation of pointer 14 and position of tip 16 are expressed in world coordinates $(X_o, Y_o, Z_o)$. World coordinates $(X_o, Y_o, Z_o)$ have a world origin (0,0,0) that can be used to describe an absolute position of tip 16 on surface 18. In fact, world coordinates $(X_o, Y_o, Z_o)$ can be used for an absolute measure of any parameter(s) of the pose of pointer 14. Alternatively, any parameter(s) of the pose of pointer 14 can be described in a relative manner, e.g., with reference to non-stationary or relative coordinates $(X_i, Y_i, Z_i)$ or simply with respect to the previous pose.

To describe the absolute pose of pointer 14 it is convenient to relate Euler rotated object coordinates describing the orientation of pointer 14 to world coordinates $(X_o, Y_o, Z_o)$. To do this, one notes that the orientation of object axis Z' in world coordinates $(X_o, Y_o, Z_o)$ prior to the three Euler rotations is normal to plane $(X_o, Y_o)$. Second Euler angle $\theta$ defines the only counterclockwise rotation of object coordinates that is not about an object Z axis (this second rotation is about the X''=X''' axis rather than axis Z', Z'' or Z'''). Thus, Euler angle $\theta$ is an inclination angle $\theta$ between the completely Euler rotated object axis Z or axis C.A. and original object axis Z', which is normal to plane $(X_o, Y_o)$ at the point of contact of tip 16.

Optical measuring arrangement 22 measures the pose of pointer 14 during motion 40 at measurement times $t_i$ and processor 26 prepares corresponding pose data 12. Pose data 12 consists of measured values of parameters $(\phi,\theta,\psi,x,y,z)$ at measurement times $t_i$. Invariant features 32, 34, 36 whose positions are defined in world coordinates $(X_o,Y_o,Z_o)$ are employed by optical measuring arrangement 22 to express pose data 12 in world coordinates $(X_o,Y_o,Z_o)$. The frequency of the periodic measurements depends on the use of pose data 12 and desired performance, e.g., temporal resolution. It should be noted that periodic measurement is not limited to any predetermined time or frequency schedule. In other words, the times between any two successive measurements of the pose can be arbitrary. Preferably, however, arrangement 22 measures the pose at a frequency that is high enough to obtain pose data 12 that describe motion 40 at the temporal resolution required by application 28.

Wireless transmitter 30 of communication link 24 sends pose data 12 or parameters $(\phi,\theta,\psi,x,y,z)$ collected at measurement times $t_i$ to processor 26. Pose data 12 can be transmitted continuously, in bursts, in parts, at arbitrary or preset times or as otherwise desired. Processor 26 prepares a subset 48 of pose data 12, for example the absolute position (x,y) of tip 16 and sends it to application 28. Application 28 uses absolute position (x,y) of tip 16 at measurement times $t_i$ to chart trace 42 of tip 16 on surface 18 as pointer 14 executes motion 40. In other words, unit 28 recovers trace 42 corresponding to the movement of tip 16. Note that the resolution of trace 42 recovered by unit 28 can be improved by increasing the number of pose measurements or increasing the frequency of measurement times $t_i$. It should be noted that pose data 12 should be formatted for appropriate communications between transmitter 30, processor 26 and application 28. Any suitable communication and formatting standards, e.g., IEEE interface standards, can be adapted for these purposes. For specific examples of formatting standards the reader is referred to Rick Poyner, LGC/Telegraphics, "Wintab™ Interface Specification: 16-bit and 32-bit API Reference", revision of May 9, 1996; Universal Serial Bus (USB), "Device Class Definition for Human Interface Devices (HID)", Firmware Specification, USB Implementers' Forum, Jun. 27, 2001 and six-degree of freedom interface by Ulrica Larsson and Johanna Pettersson, "Development and evaluation of a 6DOF interface to be used in a medical application", Thesis, Linkopings University, Department of Science and Technology, Sweden, Jun. 5, 2002.

The remaining pose data 12, i.e., $(\phi,\theta,\psi,z)$ can also be used in the present embodiment. Specifically, processor 26 can prepare additional subsets or send all of the remaining pose data as a single subset to application 28 or to a different application or device serving a different function. Any mix of orientation and position data derived from pose data 12 can be used in subset 48. In fact, in some embodiments processor 26 keeps all pose data 12 in subset 48 such that all pose data 12 is used by application 28. This is done when application 28 has to reconstruct the entire motion 40 and not just trace 42 of tip 16 on surface 18. For example, this is done when application 28 includes a motion-capture application. Once again, the temporal resolution of motion 40 can be improved by increasing the frequency of measurement times $t_i$. Note that in this case parameters of pose data 12 that vary slowly are oversampled.

It should also be noted that surface 18 is plane and hence the value of parameter z does not change. Thus, z can be set at a constant value, e.g., z=0, and left out of pose data 12 to reduce the amount of data that needs to be transmitted by transmitter 30.

Figure 3:
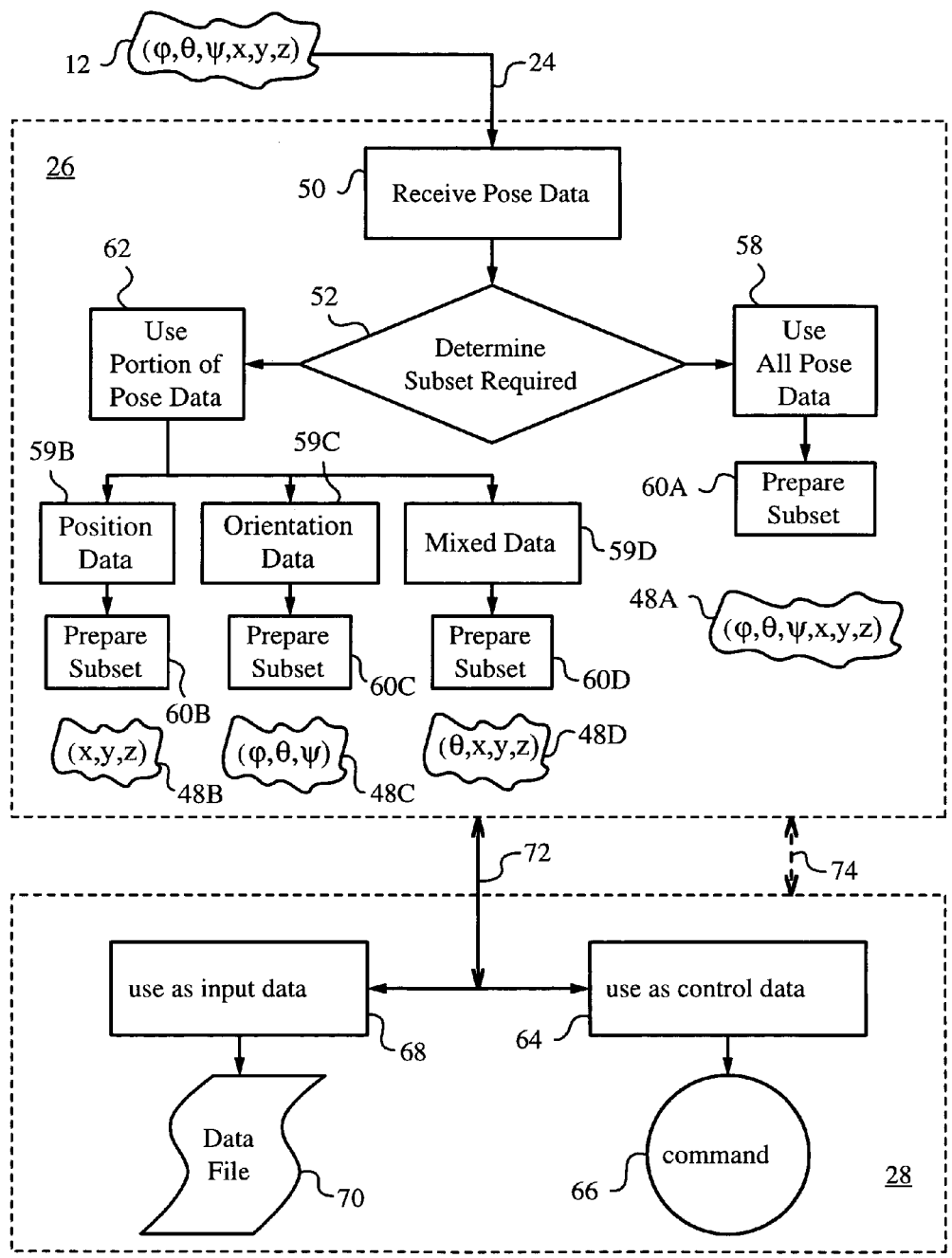
FIG. 3 is a block diagram illustrating the formatting or preparation of the pose data into subsets.

In FIG. 3 a block diagram illustrates the processing of pose data 12 by processor 26 and its use by application 28 in more detail. In a first step 50, pose data 12 is received by processor 26 via communication link 24. In a second step 52, processor 26 determines which portion or subset 48 of pose data 12 is required. This selection can be made based on application 28. For example, when application 28 is a trace-capture application that charts trace 42, then only position data of tip 16, i.e., (x,y) need to be contained in subset 48. On the other hand, when application 28 is a motion-capture application, then all pose data 12 need to be contained in subset 48.

In step 58 all pose data 12 is selected and passed to a subset formatting or preparing step 60A. In step 60A pose data 12 is prepared in the form of subset 48A as required by application 28. For example, pose data 12 is arranged in a particular order and provided with appropriate footer, header and redundancy bits (not shown), or as otherwise indicated by data porting standards such as those of Rick Poyner, LGC/Telegraphics (op. cit.).

In step 62, only a portion of pose data 12 is selected. Three exemplary cases of partial selection are shown. In the first case, only position data is required by application 28. Hence, in a step 59B only position data (x,y,z) is selected and the remaining pose data 12 is discarded. In a subsequent step 60B, position data (x,y,z) is prepared in the form of subset 48B as required by application 28 and/or as dictated by the porting standards. In the second case, in a step 59C, only orientation data $(\phi,\theta,\psi)$ is selected and the rest of pose data 12 is discarded. Then, in a step 60C, orientation data $(\phi,\theta,\psi)$ is prepared in the form of a subset 48C for use by application 28. In the third case, in a step 59D, a mix of pose data 12, including some position data and some orientation data are selected and processed correspondingly in a step 60D to prepare a subset 48D.

A person skilled in the art will appreciate that the functions described can be shared between processor 26 and application 28, e.g., as required by the system architecture and data porting standards. For example, some preparation of subset 48 can be performed by application 28 upon receipt. It should also be noted that in some embodiments pose data 12 can be pre-processed by transmitter 30 or post-processed at any point before or after preparation of the corresponding subset 48 in accordance with any suitable algorithm. For example, a statistical algorithm, such as a least squares fit can be applied to pose data 12 derived at different measurement times $t_i$ or to successive subsets 48. Furthermore, quantities such as time derivatives of any or all parameters of pose data 12, i.e., $$\left(\frac{dx}{dt}, \frac{dy}{dt}, \frac{dz}{dt}, \frac{d\phi}{dt}, \frac{d\theta}{dt}, \frac{d\psi}{dt}\right),$$

can be computed. Also, various sampling techniques, e.g., oversampling can be used.

Subset 48 is transmitted to application 28 via a communication channel 72. Application 28 receives subset 48 as an input that is treated or routed according to its use. For example, in a step 64, subset 48 is used as control data. Thus, subset 48 is interpreted as an executable command 66 or as a part of an executable command. On the other hand, in a step 68, subset 48 is used as input data and saved to a data file 70.

In one embodiment, application 28 passes information to processor 26 to change the selection criteria for subset 48. Such information can be passed via communication channel 72 or over an alternative link, e.g., a feedback link 74. For example, application 28 requests subset 48A to be transmitted and uses subset 48A as input data for data file 70. At other times, application 28 requests subset 48C to be transmitted and uses subset 48C as command data for executable command 66. Alternatively, processor 26 can indicate a priori whether any subset 48 should be treated as input data or control data. In still another alternative, user 38 can indicate with the aid of a separate apparatus, e.g., a switch mounted on pointer 14 (not shown), whether subset 48 is intended as control data or input data. A person skilled in the art will recognize that there exist a large number of active and passive methods for determining the interpretation and handling of data being transmitted in subset 48 by both processor 26 and application 28.

Figure 4:
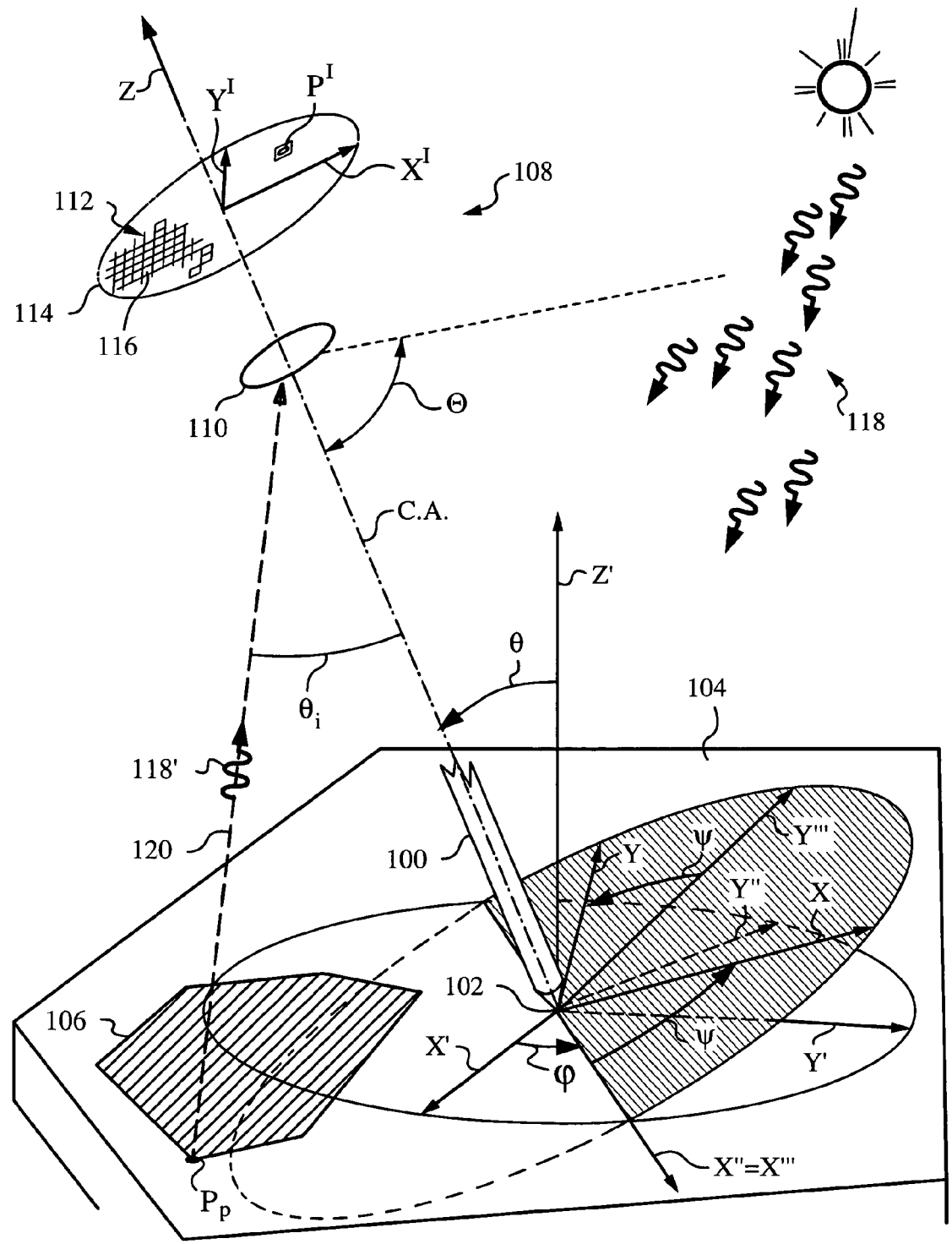
FIG. 4 is a three-dimensional view of an elongate object with an imaging system for measuring the pose.

In general, the optical measuring performed by on-board optical measuring arrangement can be implemented in a number of ways. For example, FIG. 4 illustrates an elongate object 100 with a tip 102 contacting a plane surface 104 endowed with an invariant feature 106. Invariant feature 106 is a polygon of known orientation, size and position on surface 104. Note that only a portion of object 100 is indicated for better visualization. Object 100 is aligned along the Z axis, which is collinear with a center axis C.A. that is used for reference to world coordinates (not shown).

An optical measuring system 108 is mounted on object 100 for performing on-board optical measurements of pose. In fact, system 108 is an imaging system or image capturing system for optically measuring the pose of object 100 using invariant feature 106. Imaging system 108 has a lens 110 and an image capturing device 112 in the form of an electronic optical sensor or pixel array positioned in an image plane 114 defined by lens 110. Preferably, lens 110 has a wide field of view $\Theta$ and a substantially single viewpoint for preserving 3-D perspective information of nearby surroundings. Lens 110 can include various optics including refractive, reflective and/or catadioptric optics accompanied by optical relays, mirrors, apertures, field flatteners, image guides and other elements, as will be appreciated by one skilled in the art. In fact, lens 110 should be selected as appropriate for imaging surface 104.

Array 112 has imaging pixels 116 positioned in image plane 114 described by orthogonal axes $X^I, Y^I$. These axes are parallel to axes X and Y of rotated object coordinates. The Euler angles from non-rotated to rotated object coordinates are as indicated.

During operation, radiation 118 such as sunlight or artificial illumination is incident on surface 104. A scattered portion 118' of radiation 118 travels to elongate object 110 at an angle of incidence $\theta_i$ to central axis C.A. More precisely, scattered portion 118' such as that propagating along path 120 scattered from a point $P_p$ of a corner of invariant feature 106 arrives within solid angle $\Theta$ and is imaged by imaging system 108 on image plane 114 at image point $P^{I}$. Scattered portion 118' from point $P_p$ and from the remainder of feature 106 and plane 104 or their portions carries with it image information. This spatial intensity variation or image information is used to determine the pose of object 100 in accordance with any technique for recovering position from an image of surface 104 and feature 106 produced on imaging pixels 116 of array 112. A person skilled in the art will recognize that perspective imaging is particularly well-suited for this purpose. For more information on appropriate imaging optics and methods the reader is referred to U.S. patent application Ser. No. 10/640, 942.

Figure 5:
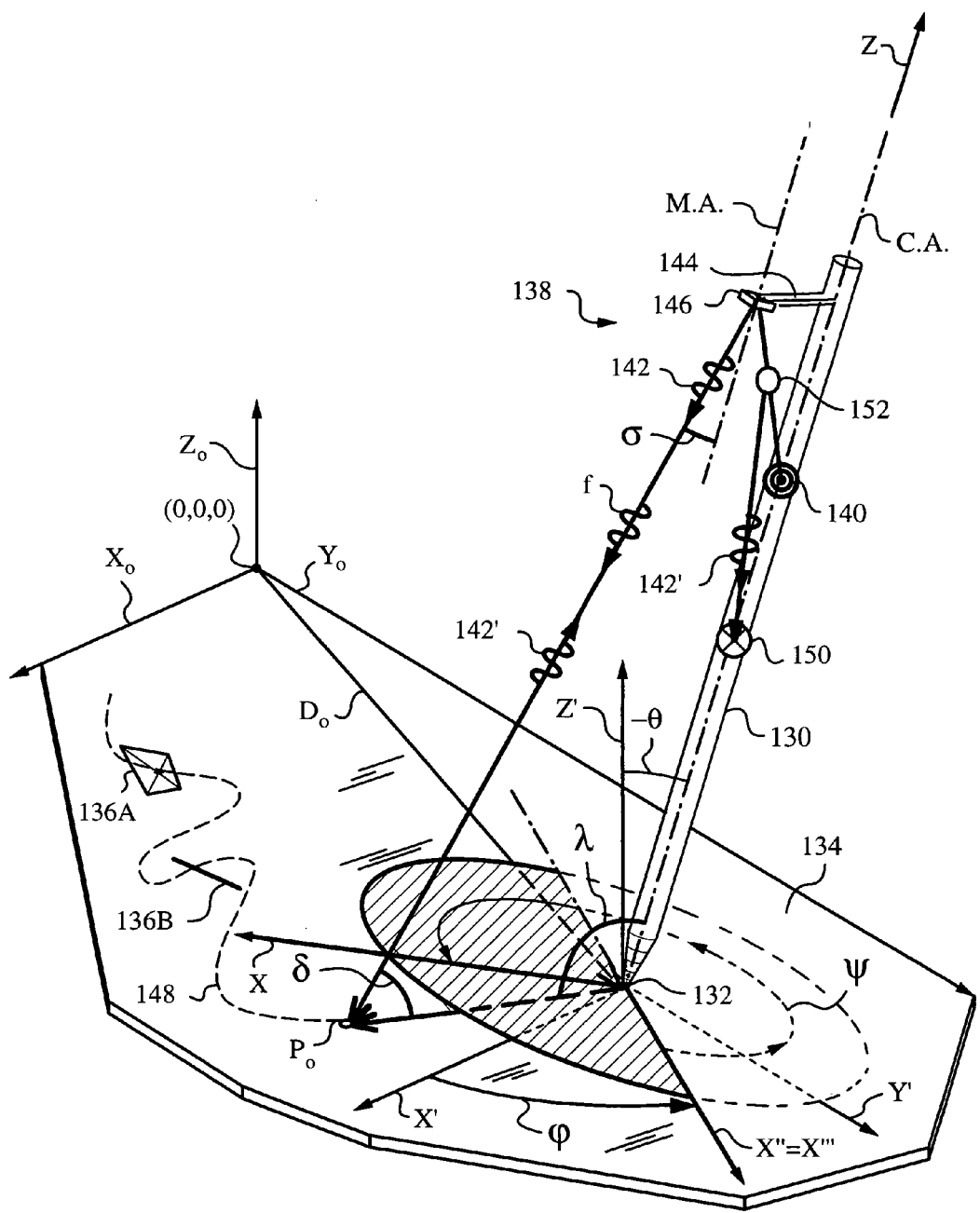
FIG. 5 is a three-dimensional view of an elongate object with a scanning system for measuring the pose.

Another alternative for implementing an on-board optical measuring arrangement is shown in FIG. 5. Here, an elongate object 130 with a tip 132 contacting a plane surface 134 endowed with invariant features 136 uses a scanning system 138 as its on-board optical measuring arrangement. The Euler angles from non-rotated to rotated object coordinates are indicated. Invariant features 136 include a quadrilateral 136A and a line 136B, both of known size, orientation and position in world coordinates $(X_o, Y_o, Z_o)$.

Scanning system 138 has a source 140 of probe radiation 142, an arm 144, and a scan mirror 146 for directing probe radiation 142 at surface 134. Scanning system 138 uses a driver for driving scan mirror 146 to scan surface 134 and invariant features 136. For example, scan mirror 146 is a biaxial scan mirror driven by a biaxial driver. Mirror 146 directs radiation 142 at a scan angle $\alpha$ with respect to a mirror axis M.A., which in the present embodiment is parallel to a center axis C.A. of object 130. The driver varies scan angle $\sigma$ in accordance with a scan pattern 148 to effectuate the scan of surface 134 and features 136. At a particular scan angle $\sigma$, radiation 142 is incident on surface 134 at a particular point $P_o$ and at an angle of incidence or inclination angle $\delta$ with respect to surface 134. Point $P_o$ moves over surface 134 and features 136 in accordance with scan pattern 148 as dictated by the driver and pose of object 130.

Probe radiation 142 scatters at point $P_o$ based on incident directions of probe radiation 142 to surface 134, frequency f of probe radiation 142, as well as physical characteristics of surface 134 and of invariant features 136. The response of a back-scattered portion 142' of probe radiation 142 to surface 134 and features 136 can thus be described by temporal changes in the intensity of back-scattered portion 142' as scanning occurs. In general, the response of back-scattered portion 142' to surface 134 and to features 136 can include not only a change in intensity but also a polarization-based response. This response of back-scattered portion 142' of probe radiation 142 to surface 134 and to invariant features 136 can be used to measure the pose of object 130. It should be noted that any invariant feature yielding a detectable reaction to probe radiation 142 and whose position in world coordinates is fixed can be used.

The pose of object 130 in 3-D space includes the position of tip 132 on surface 134 as well as the orientation of elongate object 130 in three dimensional space. In this embodiment, the position of tip 132 in world coordinates $(X_o, Y_o, Z_o)$ is expressed by a vector $D_o$ and the orientation by Euler angles $(\phi, \theta, \psi)$. This is particularly convenient, since the inclination of elongate object 130 to plane surface 134 described by an inclination angle $\theta$ between an axis of object 130, in this case axis C.A. and a normal to surface 134, i.e., axis Z', and second Euler angle $\theta$ are equivalent.

Surface 134 and invariant features 136A and 136B cause a temporal intensity variation in back-scattered portion 142' corresponding to scan point $P_o$ of probe radiation 142 traversing them. The temporal intensity variation of back-scattered portion 142' is measured by a detector 150. In the present embodiment, detector 150 and an optic 152, e.g., a beamsplitter, are provided on object 130 to direct back-scattered portion 142' of probe radiation 142 to detector 150 for detecting the intensity variation. The pose of object 130 is obtained from the knowledge of scan pattern 148, surface 134 and invariant features 136 in accordance with any suitable spatio-temporal scanning technique. Additional knowledge such as inclination angle $\theta$ or second Euler angle and third Euler angle $\psi$ can be employed in deriving absolute position of tip 132. Angles $\theta$ and $\psi$ can be obtained from an inclinometer (not shown) or any other apparatus and/or method. For some specific examples of scanning techniques that can be used in measuring the pose of object 130 reader is referred to U.S. Pat. No. 7,088,440.

In still other embodiments the on-board optical measuring arrangement can combine elements of imaging and scanning in a hybrid system. For example, pixel arrays with passive imaging pixels and active illumination pixels can be used to form hybrid imaging and scanning elements. In addition, systems with distinct points of view can be used to take advantage of stereo imaging and scanning techniques. In still other embodiments, one can use an optical system having a pixel array that operates in a projection rather than imaging mode, i.e., the optics associated with this system do not perform only imaging but also project radiation from the pixel array. A person skilled in the art will recognize that there exist a large number of alternatives for constructing the optical measuring arrangement.

Figure 6:
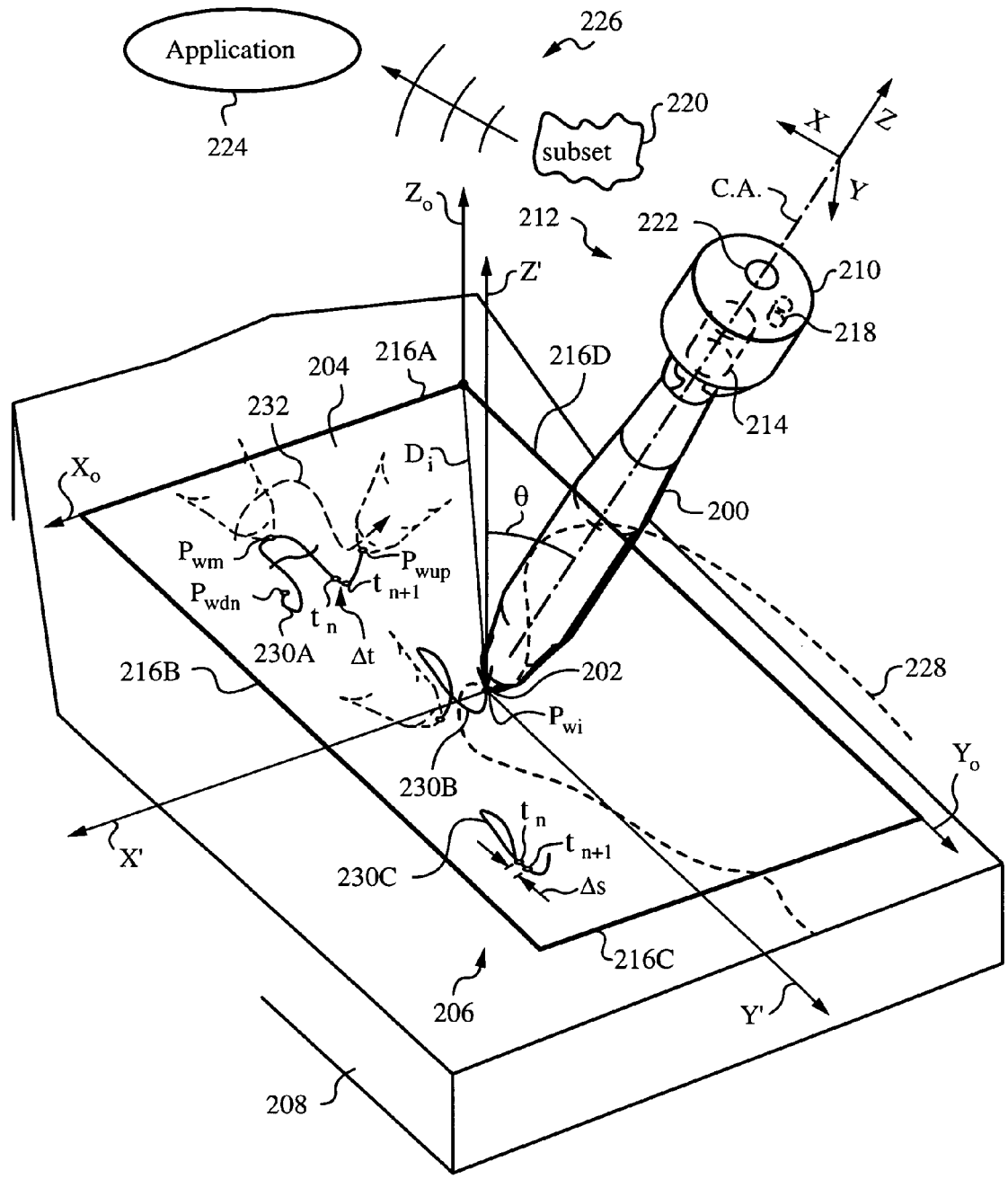
FIG. 6 is a three-dimensional view of a preferred application in which the elongate object is a jotting implement for jotting on a plane surface.

FIG. 6 is a three-dimensional view of a preferred embodiment in which an elongate object 200 is a jotting implement such as a pen, pencil or stylus. In particular, jotting implement 200 is a pen whose tip 202 is a writing nib in contact with a plane surface 204 of a sheet of paper 206 on a tabletop 208. Pen 200 has a center axis C.A. aligned with the Z axis in Euler rotated pen coordinates (X,Y,Z). An inclination angle θ corresponding to second Euler angle is shown with respect to Z' axis which also represents a surface normal.

A housing 210 is mounted at a top end 212 of pen 200. Housing 210 has an optical measuring arrangement 214 for optically measuring the pose of pen 200 from on-board pen 200. Optical measuring arrangement 214 is an imaging system, a scanning system or a hybrid system. Surface 204 of paper 206 has invariant features 216A, 216B, 216C, and 216D in the form of paper edges. Features 216 are used by optical measuring arrangement 214 to measure the pose of pen 200.

Housing 210 holds a processor 218 for preparing pose data corresponding to the pose measured by optical measuring arrangement 214 and identifying a subset 220 of the pose data. A transmitter 222 is provided in housing 210 for transmitting subset 220 to an application 224 via a wireless communication link 226. Since the elements in housing 210 and their operation have been described above they will not be addressed in detail in this embodiment.

A user holds pen 200 in hand 228 and moves it while contacting surface 204 to produce marks representing handwriting, for example. Hand 228 is indicated in a dashed outline for better visualization. A pressure sensor or other device (not shown) ascertains contact between nib 202 and surface 204. While the user is jotting, optical measuring apparatus periodically measures the pose of pen 200. In particular, while pen 200 is in motion corresponding to jotting, optical measuring arrangement 214 measures the pose periodically at measurement times $t_i$ such that the pose data describes the motion of pen 200 in sufficient detail to be useful in application 224.

For example, when application 224 is a general motion-capture application the frequency of measurement times $t_i$ is on the order of 75 Hz. In some motion-capture applications such as biometric applications requiring precise knowledge of the motion pen 200, e.g., to derive a biometric of hand 228, more frequent measurement times $t_i$, e.g., in excess of 100 Hz can be used. In particular, such precise knowledge can be required when the biometric application is a user verification application. In another embodiment, application 224 is a trace-capture application for capturing traces 230A, 230B and 230C marked by pen 200 on paper 206. More precisely, application 224 is an on-line or off-line handwriting recognition application requiring that measurement times $t_i$ be on the order of 100 Hz (Δt=1/100 s) to properly recognize handwriting. Another application 224 may require that a distance Δs that nib 202 moves on paper surface 204 between successive measurements be on the order of 1/200 of an inch or about 0.12 mm. In still another embodiment, the trace-capture application can be a signature verification application that can require higher precision than handwriting recognition. It should be noted that the biometric application can also perform user identification and/or signature verification. In the present embodiment, application 224 is an on-line handwriting recognition application and measurement times $t_i$ are repeated at a frequency on the order of 100 Hz.

During operation the user moves hand 228 translating to a motion of pen 200 resulting in ink traces 230 on surface 204 of paper 206. Traces 230 are produced when nib 202 contacts surface 204 at a writing point during the motion. Optical measuring arrangement 214 measures the pose of pen 200 periodically at measurement times $t_i$ with the aid of invariant features 216 while traces 230 are being produced.

A first writing point $P_{wdn}$, sometimes referred to as pen-down, and a last writing point $P_{wup}$, sometimes referred to as pen-up, are indicated on trace 230A which nib 202 produced during a motion 232 of pen 200. Also indicated is an intermediate writing point $P_{wm}$ at a location at which nib 202 was located during a specific measurement time $t_m$. Two writing points at successive measurement times $t_n$ and $t_{n+1}$ are also shown and, for illustrative purposes, a time duration Δt between them. Trace 230B is shown in the process of being written by the user. Trace 230C has already been written, and two writing points at successive measurement times $t_n$ and $t_{n+1}$ are shown separated by a distance Δs.

Application 224 is an on-line handwriting recognition application and so the frequency of measurement times $t_i$ between pen-down and pen-up points for each trace 230A, 230B and 230C is on the order of 100 Hz such that time duration Δt is about 1/100 s. Therefore, pose of pen 200 is measured by arrangement 214 with a temporal resolution of about 1/100 s.

Processor 218 prepares pose data corresponding to the succession of poses assumed by pen 200 in motions executed between pen-down and pen-up points. Processor 218 also identifies the pose data this is required in subset 220 to run application 224. In some handwriting recognition applications, subset 220 need only contain the absolute positions of nib 202 at measurement times $t_i$ corresponding to writing points $P_{wi}$. In other words, subset 220 only contains position data of nib 202 on surface 204 rather than orientation data of pen 200. Furthermore, the locations of writing points $P_{wi}$ are expressed by corresponding vectors $D_i$ in global coordinates $(X_o, Y_o, Z_o)$ having an origin at the top right corner of paper 206.

In an alternative embodiment, handwriting recognition application 224 requires orientation data in subset 220. For example, an on-line handwriting recognition application 224 requires inclination angle θ to be contained in subset 220. Note that inclination angle θ is also the second Euler angle. Still other handwriting recognition application 224 requires subset 220 to contain more or even all orientation data, i.e., all three Euler angles. In fact, processor 218 can be informed by application 224 of its particular requirements at any given time with respect to subset 220, e.g., via communication link 226. In cases where subset 220 is to contain additional information, such as first or higher-order derivatives of any com bination of or all position and orientation data, e.g., second order derivatives $$\left(\frac{d^2x}{dt^2}, \frac{d^2y}{dt^2}, \frac{d^2z}{dt^2}, \frac{d^2\phi}{dt^2}, \frac{d^2\theta}{dt^2}, \frac{d^2\psi}{dt^2}\right),$$

these can either be computed by processor 218 and included in subset 220, or they can be computed by application 224, as convenient.

In an alternative embodiment, pen 200 is a stylus that leaves no traces 230. In other words, nib 202 is a point that makes no markings. In this embodiment surface 204 does not have to be a paper surface; it can be replaced by any plane surface on which jotting can be performed. Otherwise the method is the same as described above.

Figure 7:
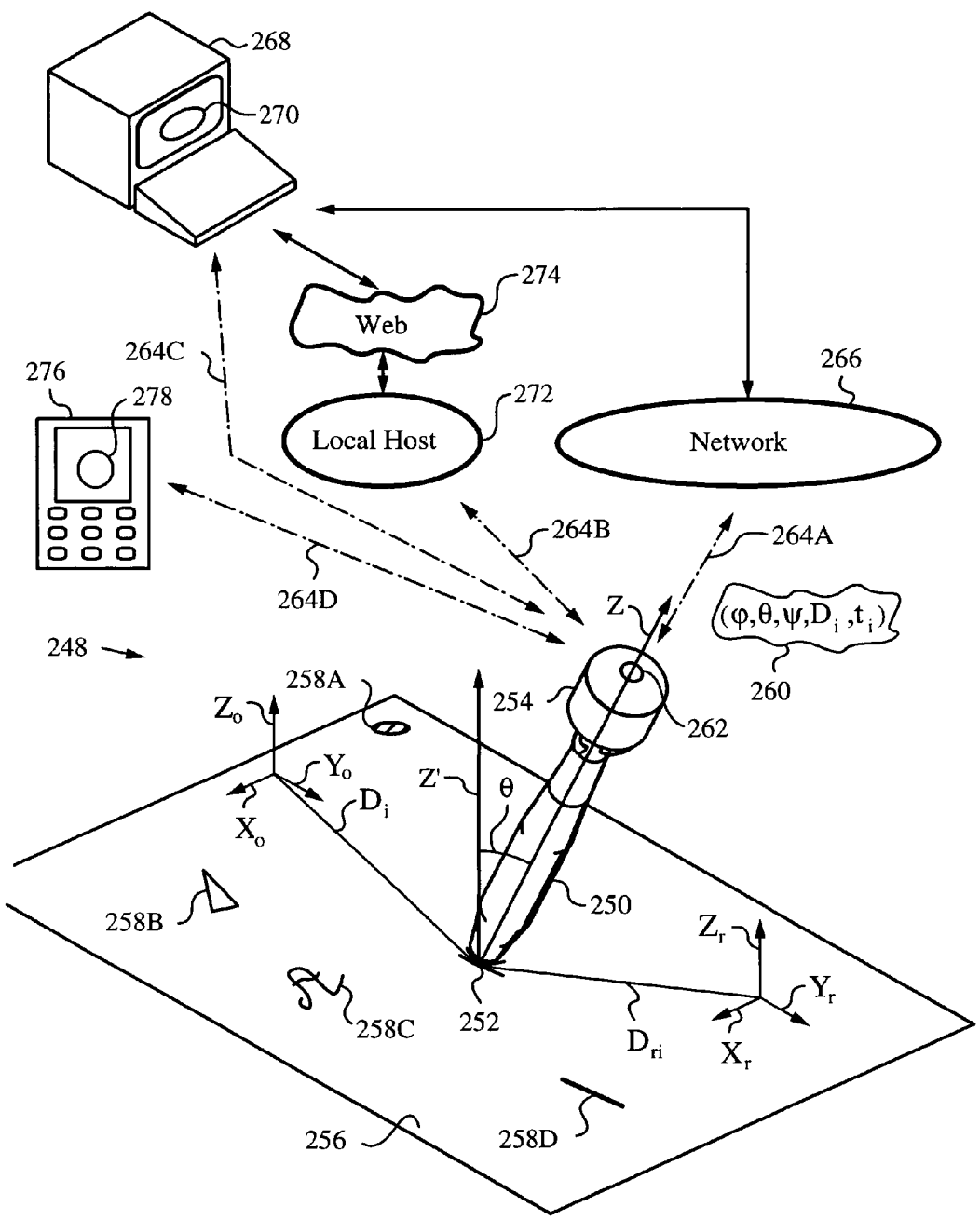
FIG. 7 is a diagram illustrating the jotting implement communicating pose data to remote devices via communication links.

FIG. 7 illustrates another embodiment of an apparatus 248 for processing pose data derived from a pose of an elongate object 250 having a tip 252. Object 250 is a stylus whose tip 252 does not produce traces. Object 250 has a housing 254 containing an optical measuring arrangement and a processor (not shown). A wireless transmitter 262 is provided for communication.

Tip 252 is placed on a plane surface 256 with invariant features 258A, 258B, 258C, and 258D. The measurement arrangement relies on features 258 for periodically measuring the pose of stylus 250 at measurement times $t_i$ when tip 252 contacts surface 256. The processor prepares pose data corresponding to the pose and identifies a subset 260 to be transmitted. In the present case, subset 260 contains all pose data and is transmitted after each measurement time $t_i$ with a time stamp, also referenced by $t_i$. Position data is expressed in the form of a vector $D_i$ in world coordinates $(X_o,Y_o,Z_o)$ selected by the optical measurement arrangement. Orientation data is expressed in Euler angles.

Transmitter 262 transmits subset 260 via communication links 264A, 264B, 264C and 264D to various devices having resident applications requiring subset 260. Specifically, link 264A connects to a network 266 that in turn connects to a computer 268, e.g., a personal computer that runs an application 270 requiring subset 260. Network 266 can be any type of network, including the internet, a local area network (LAN), a telephone network or any network capable of transmitting subset 260. Link 264B connects to a local host 272, e.g., a host computer, which is in communication with computer 268 via web 274. It should be noted that application 270 can be shared between computer 268 and local host 272, or each can use set 260 for its own separate application. Alternatively, local host 272 can serve as a relay computer only. Link 264C connects directly to computer 268 and may be a short-distance link, e.g., a link which is only active when stylus 250 is operating in proximity to computer 268. Link 264D connects to a device 276 running another application 278. For example, device 276 is a personal digital assistant (PDA) or a cellular telephone. In fact, link 264D can be an infrared link or an ultrasound link, in which case a corresponding transmitter is used to replace wireless transmitter 262. It should be noted that stylus 250 can communicate via any combination of links 264 with any device it needs to be in communication with at any given time. The devices may use links 264 to communicate their availability and subset preferences to stylus 250 at any time.

During operation, stylus 250 can include in subset 260 absolute position data or vector $D_i$ expressed in world coordinates. Alternatively, stylus 250 can include in subset 260 relative position data or vector $D_{ri}$ in relative coordinates $(X_r,Y_r,Z_r)$. In still another alternative, subset 260 includes relative position data with respect to the previous position, i.e., vector $\Delta D = D_{ri} - D_{ri-1}$. That is because some applications require only knowledge of the relative position of tip 252. It should also be noted that the processing of pose data and identification of subset 260 is a task that can be shared between pen 250 and any other devices. In fact, the processor required for processing the pose to derive the pose data and identify subset 260 can reside entirely on another device, e.g., on computer 268.

Figure 8:
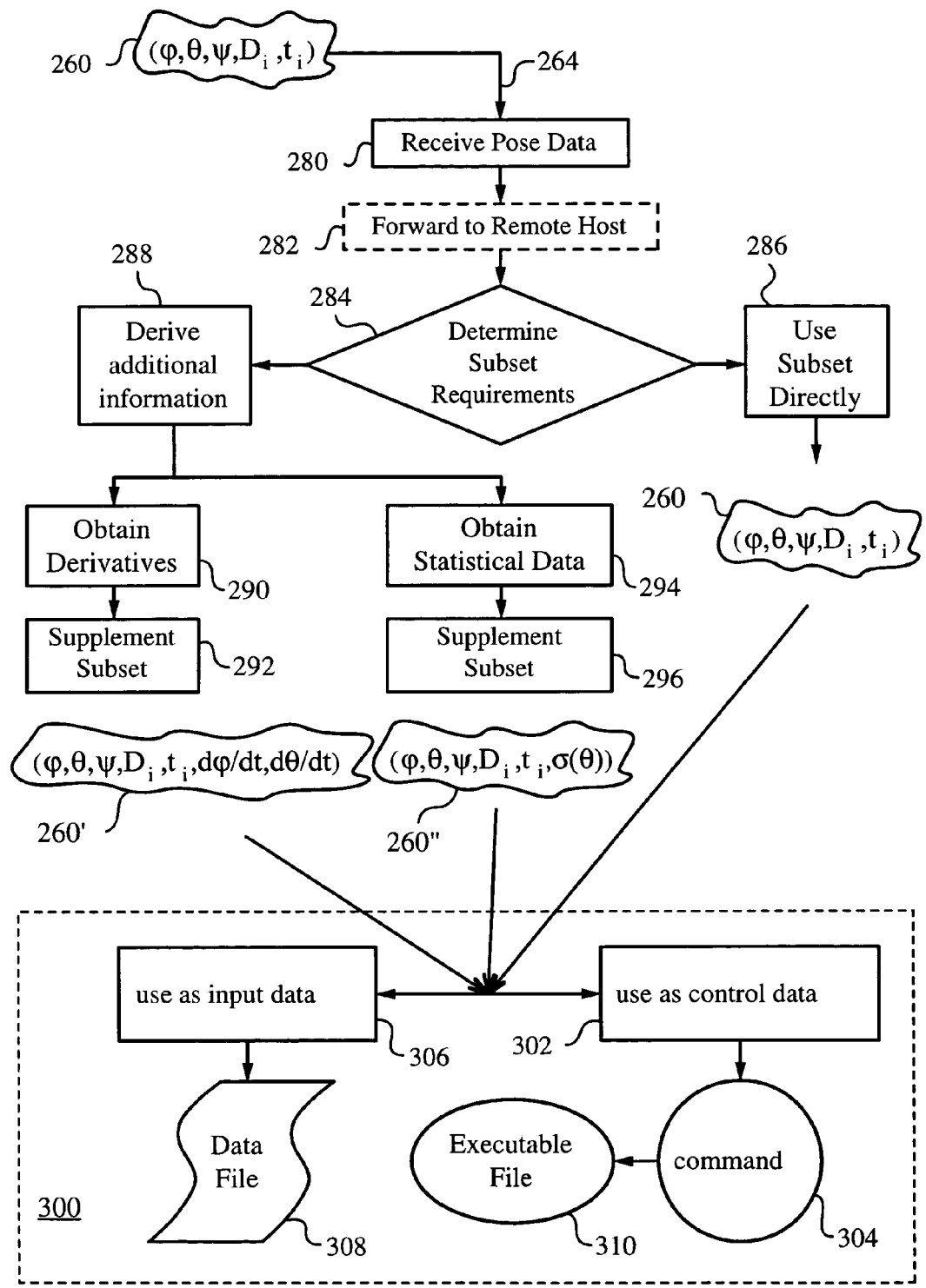
FIG. 8 is a block diagram illustrating the uses of command and input data derived from the pose data of the jotting implement of FIG. 7.

FIG. 8 is a block diagram illustrating a few exemplary uses of command and input data from subset 260 of jotting implement 250. In a first step 280, subset 260 is received by either a local host or a network via communication link 264. If subset 260 is intended for a remote host, then it is forwarded to the remote host in a step 282.

In a second step 284, a processor in the intended host (local host or remote host, as the case may be) determines the requirements for subset 260. This selection can be made based on an intended application 300. For example, when application 300 only requires the parameters already contained in subset 260, then subset 260 is forwarded to step 286 for preparation and direct use. Alternatively, when application 300 requires additional parameters, subset 260 is forwarded to step 288 for derivation of these additional parameters.

For example, the additional parameters are derivatives of one or more of the parameters in subset 260. Thus, subset 260 is sent to a differentiation module 290 and then to a preparation module 292 for supplementing subset 260 with the derivatives. In the example shown, time derivatives of Euler angles $\phi$ and $\theta$ are required and thus, supplemented and prepared subset 260' contains these time derivatives. Alternatively, statistical information about one or more of the parameters in subset 260 are required. Thus, subset 260 is sent to a statistics module 294 and then to a preparation module 296 for supplementing subset 260 with the statistical information. In the present example, the statistical information is a standard deviation of second Euler angle $\theta$. Thus, supplemented and prepared subset 260" contains the parameters of subset 260 and standard deviation of angle $\theta$.

A person skilled in the art will appreciate that the functions described can be shared between local and remote hosts as well as application 300, e.g., as required by the system architecture and data porting standards. For example, some preparation and supplementing of subset 260 can be performed by application 300 upon receipt.

Subset 260 is transmitted to application 300 for use as an input that is treated or routed according to its use. For example, in a step 302, subset 260' is used as control data. Thus, subset 260' is interpreted as an executable command 304 or as a part of an executable command and used in an executable file 310. On the other hand, in a step 306, subset 260" is used as input data and saved to a data file 308.

In one specific application, application 300 is a trace-capture application and subset 260' is used as control data in accordance with standard Boolean logic. Specifically, application includes a Boolean logic symbol reformatting function to translate the control data into a Boolean logic command, e.g., OR, AND or XOR.

Figure 9:
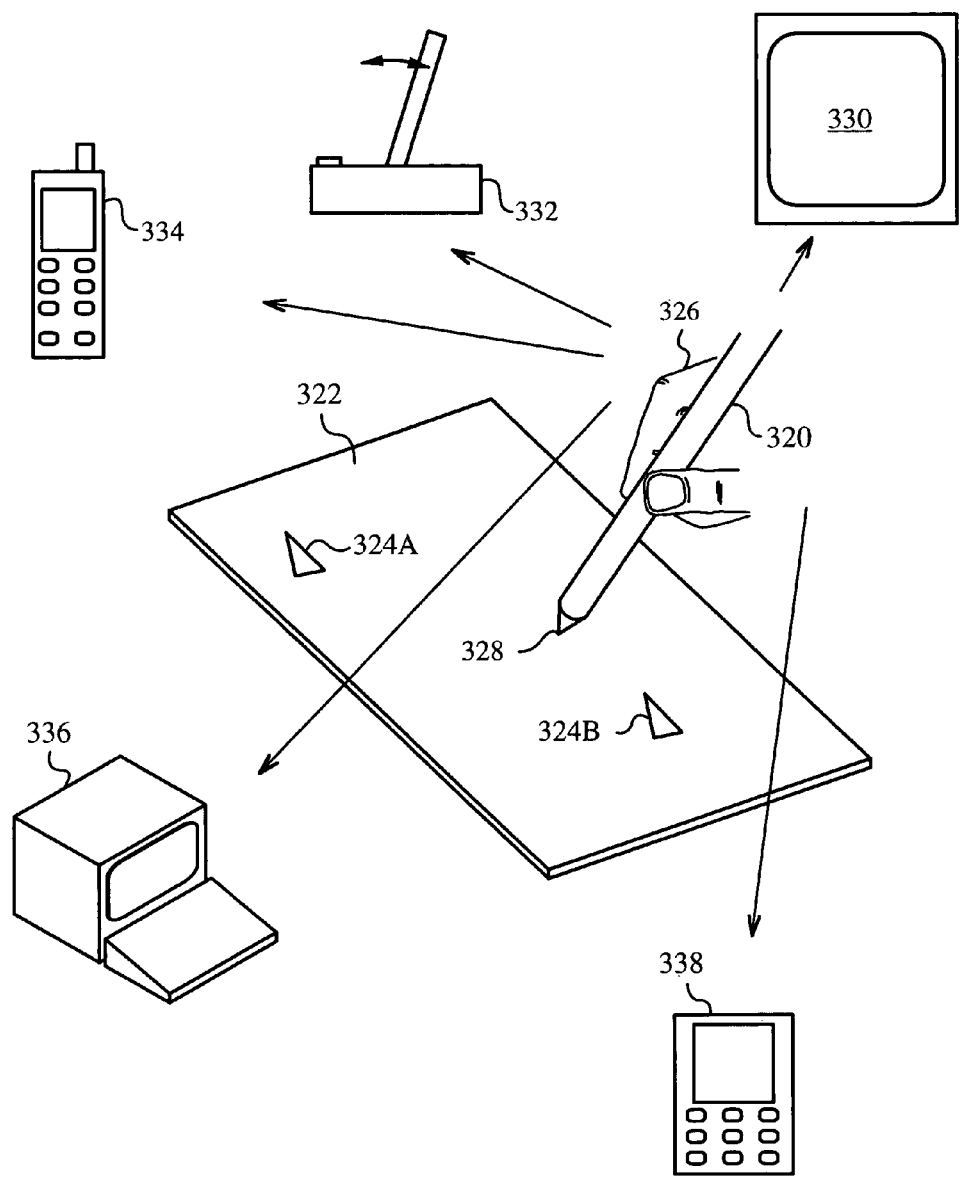
FIG. 9 is a diagram illustrating still another embodiment of the apparatus of invention.

FIG. 9 is a diagram illustrating still another embodiment of the apparatus of invention. In this embodiment an elongate object 320 is a jotting implement employed on a jotting surface 322 with invariant features 324A and 324B. Jotting surface 322 can be a screen, a pad, a paper surface or any other convenient surface from which jotting implement 320 can determine pose with the aid of an on-board optical measuring arrangement in accordance with the above teaching. Jotting implement 320 is a pen, pencil or a stylus.

A user 326 employs jotting implement 320 by placing its tip 328 on surface 322 and executing motions to generate pose data. Pose data is processed into subsets and transmitted to a variety of user devices that include, but are not limited to, a mainframe computer 330, a joystick 332, a cellular telephone 334, a personal computer 336 and a personal digital assistant 338. Each of these devices uses the appropriate portion of the subset. For example, joystick 332 strips all parameters other than Euler angles $\phi$, $\theta$ and uses these as control data. Alternatively, joystick 332 retains Euler angle $\psi$ and uses it as control data to emulate an activation button function. On the other hand, cellular telephone 334 uses Euler angles to select dial numbers and position data as control data to execute a dial command.

It should be noted that the elongate object can be any type of elongate device whose physical pose can yield useful data. Thus, although the above examples indicate that the elongate object is a jotting implement, pointer, cane, or robotic arm other elongate objects can be used. Also, the subset identified form the pose data can be supplemented with various additional data that may be derived from other devices that are or are not on-board the elongate object.

Furthermore, the pose data and/or data in the subset can be encrypted for user protection or other reasons, as necessary.

It will be evident to a person skilled in the art that the present invention admits of various other embodiments. Therefore, its scope should be judged by the claims and their legal equivalents.

The invention claimed is:

1. A method for processing pose data derived from an absolute pose of an elongate object having a tip, said method comprising:
   a) placing said tip on a plane surface with an invariant feature that is tangible and whose position is defined in world coordinates parameterized by world coordinate vectors $(X_o, Y_o, Z_o)$ where $X_o$ is a Cartesian x-axis, $Y_o$ is a Cartesian y-axis and $Z_o$ is a Cartesian z-axis, said Cartesian axes intersecting at a world origin (0,0,0);
   b) measuring said absolute pose optically from on-board said elongate object with an optical arrangement mounted at a top end of said elongate object and using said invariant feature in a pose recovery technique comprising geometric invariance, said absolute pose comprising measured values of parameters $(\phi, \theta, \psi, x, y, z)$ representing Euler rotated object coordinates parameterized by object coordinate vectors (X,Y,Z) with said parameters $(\phi, \theta, \psi)$ being Euler angles defining an orientation of said elongate object with respect to Cartesian axes $X_o$, $Y_o$, $Z_o$ of world coordinates $(X_o, Y_o, Z_o)$, and with said parameters (x,y,z) being the position of a point on said elongate object expressed in said world coordinates with respect to said world origin (0,0,0);
   c) preparing pose data corresponding to said absolute pose;
   d) identifying a subset of said pose data; and
   e) transmitting said subset to an application.

2. The method of claim 1, wherein said elongate object is undergoing a motion and said measuring is performed periodically at measurement times $t_i$, such that said pose data describes said motion.

3. The method of claim 1, wherein said subset comprises orientation data.

4. The method of claim 3, wherein said subset comprises an inclination angle $\theta$.

5. The method of claim 3, wherein said subset comprises at least one Euler angle.

6. The method of claim 3, wherein said orientation data is used as input selected from the group consisting of control data and input data.

7. The method of claim 2, wherein said subset comprises position data of said tip on said surface.

8. The method of claim 7, wherein said position data comprises a position of said tip relative to said invariant feature.

9. The method of claim 7, wherein said position data comprises an absolute position of said tip on said surface.

10. The method of claim 7, wherein said position data comprises a position of said tip relative to a previous absolute position of said tip on said surface.

11. The method of claim 7, wherein said position data is used as an input selected from the group consisting of control data and input data.

12. The method of claim 1, wherein said plane surface comprises a jotting surface and said elongate object is a jotting implement.

13. The method of claim 12, wherein said jotting surface is selected from the group consisting of a screen, a tablet, a pad and a paper surface.

14. The method of claim 1, wherein said elongate object is selected from the group consisting of jotting implements, pointers, robotic arms and canes.

15. The method of claim 14, wherein said jotting implements are selected from the group consisting of pens, pencils and styluses.

16. An apparatus for processing pose data derived from an absolute pose of an elongate object having a tip, said apparatus comprising:
   a) a plane surface for placing said tip thereon, said plane surface having an invariant feature that is tangible and whose position is defined in world coordinates parameterized by world coordinate vectors $(X_o, Y_o, Z_o)$ where $X_o$ is a Cartesian x-axis, $Y_o$ is a Cartesian y-axis and $Z_o$ is a Cartesian z-axis, said Cartesian axes intersecting at a world origin (0,0,0);
   b) an optical measuring means mounted at a top end of said elongate object for optically measuring said absolute pose from on-board said elongate object using said invariant feature in a pose recovery technique comprising geometric invariance, said absolute pose comprising measured values of parameters $(\phi, \theta, \psi, x, y, z)$ representing Euler rotated object coordinates parameterized by object coordinate vectors (X,Y,Z) with said parameters $(\phi, \theta, \psi)$ being Euler angles defining an orientation of said elongate object with respect to Cartesian axes $X_o$, $Y_o$, $Z_o$ of world coordinates $(X_o, Y_o, Z_o)$, and with said parameters (x,y,z) being the position of a point on said elongate object expressed in said world coordinates with respect to a world origin (0,0,0);
   c) a processor for preparing pose data corresponding to said absolute pose and identifying a subset of said pose data; and
   d) a communication link for transmitting said subset to an application.

17. The apparatus of claim 16, wherein said optical measuring means comprises a periodic measurements means for periodically measuring said absolute pose at measurement times $t_i$.

18. The apparatus of claim 16, wherein said processor is mounted on said elongate object.

19. The apparatus of claim 16, wherein said communication link is a wireless communication link.

20. The apparatus of claim 16, wherein said elongate object is selected from the group consisting of jotting implements, pointers, robotic arms and canes.

21. The apparatus of claim 20, wherein said jotting implements are selected from the group consisting of pens, pencils and styluses.

22. The apparatus of claim 16, wherein said application comprises a data file and said subset comprises input data to said data file.

23. The apparatus of claim 16, wherein said application comprises an executable file and said subset comprises control data to said executable file.

24. The apparatus of claim 16, wherein said application comprises a motion-capture application.

25. The apparatus of claim 24, wherein said motion-capture application comprises a biometric application.

26. The apparatus of claim 25, wherein said biometric application comprises a user verification application.

27. The apparatus of claim 16, wherein said application comprises a trace-capture application.

28. The apparatus of claim 27, wherein said trace-capture application comprises a handwriting recognition application.

29. The apparatus of claim 27, wherein said trace-capture application comprises a signature verification application.

30. The apparatus of claim 27, wherein said trace-capture application comprises a Boolean logic symbol reformatting function.

* * * * *